(12) United States Patent
Kanada et al.

(10) Patent No.: US 12,474,074 B2
(45) Date of Patent: Nov. 18, 2025

(54) REARRANGEMENT OF OPERATION ICONS FOR OPERATION TERMINAL AND HOME APPLIANCE CONTROL SYSTEM

(71) Applicant: Mitsubishi Electric Corporation, Tokyo (JP)

(72) Inventors: Hiromitsu Kanada, Tokyo (JP); Rina Shimizu, Tokyo (JP); Yoshio Harada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 387 days.

(21) Appl. No.: 18/006,073

(22) PCT Filed: Oct. 23, 2020

(86) PCT No.: PCT/JP2020/039923
§ 371 (c)(1),
(2) Date: Jan. 19, 2023

(87) PCT Pub. No.: WO2022/085184
PCT Pub. Date: Apr. 28, 2022

(65) Prior Publication Data
US 2023/0280062 A1 Sep. 7, 2023

(51) Int. Cl.
*F24F 11/52* (2018.01)
*G06F 3/0482* (2013.01)
*G06F 3/04845* (2022.01)

(52) U.S. Cl.
CPC ............ *F24F 11/52* (2018.01); *G06F 3/0482* (2013.01); *G06F 3/04845* (2013.01)

(58) Field of Classification Search
CPC ..... F24F 11/52; G06F 3/0482; G06F 3/04845
(Continued)

(56) References Cited

U.S. PATENT DOCUMENTS

2011/0072373 A1* 3/2011 Yuki .................. G06F 8/34
715/764
2011/0231800 A1 9/2011 Tomita et al.
(Continued)

FOREIGN PATENT DOCUMENTS

CN 111416757 A 7/2020
JP 2000-089890 A 3/2000
(Continued)

OTHER PUBLICATIONS

Office Action dated Oct. 24, 2023 issued in corresponding Japanese Patent Application No. 2022-556353 (and English machine translation).

(Continued)

*Primary Examiner* — Md Azad
(74) *Attorney, Agent, or Firm* — Posz Law Group, PLC

(57) ABSTRACT

An operation terminal includes a display unit, a storage unit, and a control unit. The display unit displays, for functions included in a home appliance, operation icons individually corresponding to the functions in association with control instruction information that instructs execution of the functions. The storage unit stores information on a relationship of how large or small a selection count is, which is information on a relationship of how large or small the number of selections of each of the operation icons is. The control unit determines display positions of the operation icons in the display unit on the basis of the information on the relationship of how large or small the selection count is, and causes the display unit to display the operation icons.

6 Claims, 10 Drawing Sheets

(58) Field of Classification Search
USPC .......................................................... 700/276
See application file for complete search history.

(56) References Cited

U.S. PATENT DOCUMENTS

| | | | | |
|---|---|---|---|---|
| 2015/0148968 | A1* | 5/2015 | Sasaki | F24F 11/30 |
| | | | | 700/276 |
| 2016/0334943 | A1* | 11/2016 | Jeon | G06F 3/0482 |
| 2021/0181939 | A1* | 6/2021 | Lee | G06F 3/04812 |
| 2021/0258438 | A1* | 8/2021 | Ikeda | G06F 3/04883 |

FOREIGN PATENT DOCUMENTS

| | | |
|---|---|---|
| JP | 2011-193405 A | 9/2011 |
| JP | 2013-076493 A | 4/2013 |
| JP | 2014-224671 A | 12/2014 |
| JP | 2015-069230 A | 4/2015 |
| JP | 2016-023847 A | 2/2016 |

OTHER PUBLICATIONS

International Search Report of the International Searching Authority mailed Dec. 15, 2020, issued in corresponding International Application No. PCT/JP2020/039923 (and English Machine Translation).
Office Action mailed Feb. 28, 2025 in corresponding Chinese Patent Application No. 202080105241.6 (and English machine translation).
Office Action mailed Jul. 17, 2025 in corresponding Chinese Patent Application No. 202080105241.6 (and English machine translation).

* cited by examiner

| No | FUNCTION | FUNCTION AVAILABILITY | FUNCTION STATE (FUNCTION TURNED ON/OFF) | ICON DISPLAY POSITION SETTING VALUE | NUMBER OF TIMES OF OPERATION |
|---|---|---|---|---|---|
| 1 | FUNCTION 1 | YES | ON | 2 | 10 |
| 2 | FUNCTION 2 | YES | OFF | 1 | 5 |
| 3 | FUNCTION 3 | NO | OFF | 4 | 3 |
| 4 | FUNCTION 4 | YES | ON | - | 20 |
| 5 | FUNCTION 5 | YES | ... | - | ... |
| ... | ... | ... | ... | ... | ... |

| No | FUNCTION | FUNCTION AVAILABILITY | FUNCTION STATE (FUNCTION TURNED ON/OFF) | ICON COLOR | ICON TEXT |
|---|---|---|---|---|---|
| 1 | FUNCTION 1 | YES | ON | RGB(0,0,0) | ON |
| 2 | FUNCTION 1 | YES | OFF | RGB(128,128,128) | OFF |
| 3 | FUNCTION 1 | NO | OFF | RGB(192,192,192) | UNSUPPORTED |
| 4 | FUNCTION 2 | ... | ... | ... | ... |
| ... | | | | | |

REARRANGEMENT OF OPERATION ICONS FOR OPERATION TERMINAL AND HOME APPLIANCE CONTROL SYSTEM

CROSS REFERENCE TO RELATED APPLICATION

This application is a U.S. national stage application of International Patent Application No. PCT/JP2020/039923 filed on Oct. 23, 2020, the disclosure of which is incorporated herein by reference.

TECHNICAL FIELD

The present disclosure relates to an operation terminal and a home appliance control system for remotely controlling a home appliance.

BACKGROUND

A conventional operation terminal for a home appliance such as a remote control and a smartphone has had an increasing number of functions that allow control of the operation of the home appliance from the operation terminal. Meanwhile, as the number of functions that allow control of the home appliance from the operation terminal increases, a user finds it more difficult to grasp what function the operation terminal is equipped with as a function for controlling the operation of the home appliance. Therefore, as the number of functions that allow control of the home appliance from the operation terminal increases, the operation terminal displays the functions that allow control of the home appliance from the operation terminal in a hierarchical structure from a home screen of a display unit.

Patent Literature 1 discloses that setting information that has been set using a touch panel unit is transmitted to an air conditioner body to remotely control various functions of the air conditioner body, thereby controlling the operation of the air conditioner body.

PATENT LITERATURE

Patent Literature 1: Japanese Patent Application Laid-open No. 2013-076493

However, according to the technique of Patent Literature 1 above, when the operation of the air conditioner is controlled, it is necessary to operate operating parts such as a tool bar, a bookmark, and an operation mode setting part and go through a menu screen under a menu having a hierarchical structure. This has caused a problem in that, when a user views an operation screen for controlling the operation of the air conditioner displayed on a display unit of an operation terminal, it is difficult to visually recognize a function of the air conditioner that is useful for the user and controllable from the operation terminal.

SUMMARY

The present disclosure has been made in view of the above, and an object thereof is to provide an operation terminal in which a function of a home appliance that is useful for a user and controllable from the operation terminal is easily visually recognized when the user views display unit of the operation terminal.

To solve the above problems and achieve an object, the present disclosure is directed to an operation terminal that transmits control instruction information for controlling operation of a home appliance to the home appliance. The operation terminal includes: a display unit to display, for a plurality of functions included in the home appliance, a plurality of operation icons individually corresponding to the functions in association with the control instruction information that instructs execution of the functions; a storage unit to store information on relationship of how large or small a selection count is, which is information on relationship of how large or small the number of selections of each of the plurality of operation icons is; and a control unit to determine display positions of the plurality of the operation icons in the display unit on the basis of the information on relationship of how large or small the selection count is, and cause the display unit to display the plurality of the operation icons.

The operation terminal according to the present disclosure has an effect that the function of the home appliance that is useful for a user and controllable from the operation terminal is easily visually recognized when the user views the display unit of the operation terminal.

DETAILED DESCRIPTION

Hereinafter, an operation terminal and a home appliance control system according to an embodiment will be described in detail with reference to the drawings.

First Embodiment

Figure 1:
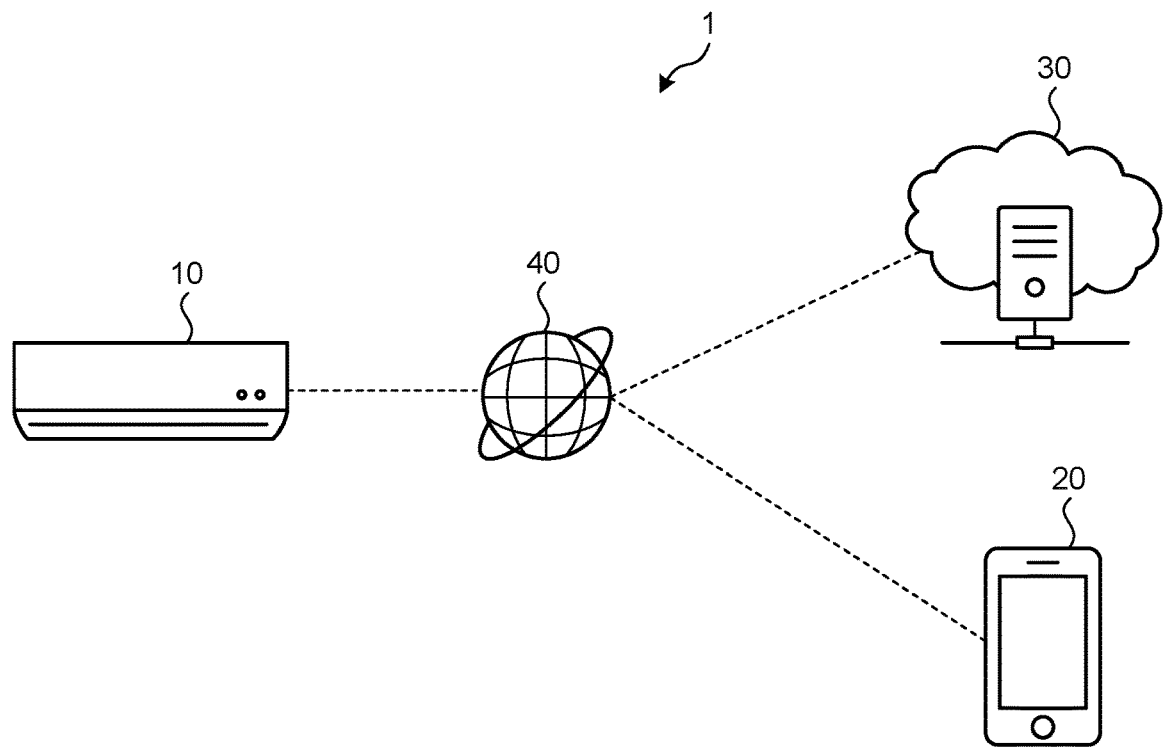
FIG. 1 is a diagram illustrating a configuration of an air conditioning control system according to a first embodiment.

FIG. 1 is a diagram illustrating a configuration of an air conditioning control system 1 according to a first embodiment. The air conditioning control system 1 according to the first embodiment includes an air conditioner 10, an operation terminal 20, and a server 30. The air conditioner 10, the operation terminal 20, and the server 30 can transmit and receive information to and from one another by connecting to Internet 40 that is a global information communication network. In the air conditioning control system 1, the operation of the air conditioner 10 can be remotely controlled by the operation terminal 20. That is, the air conditioning control system 1 is a home appliance control system including the air conditioner 10 that is a home appliance as a control-target-appliance and the operation terminal 20 that remotely controls the operation of the air conditioner 10.

The air conditioner 10 can transmit and receive information to and from the operation terminal 20 by connecting to the Internet 40. As a result, the air conditioner 10 can acquire various types of information such as control instruction information for controlling the operation of the air conditioner 10 from the operation terminal 20 via the Internet 40. That is, the operation terminal 20 can transmit various types of information such as the control instruction information for controlling the operation of the air conditioner 10 to the air conditioner 10 via the Internet 40.

Moreover, the air conditioner 10 can transmit and receive information to and from the server 30 by connecting to the Internet 40. As a result, the air conditioner 10 can transmit various types of information such as information on an operating state of the air conditioner 10 to the server 30 via the Internet 40.

Figure 2:
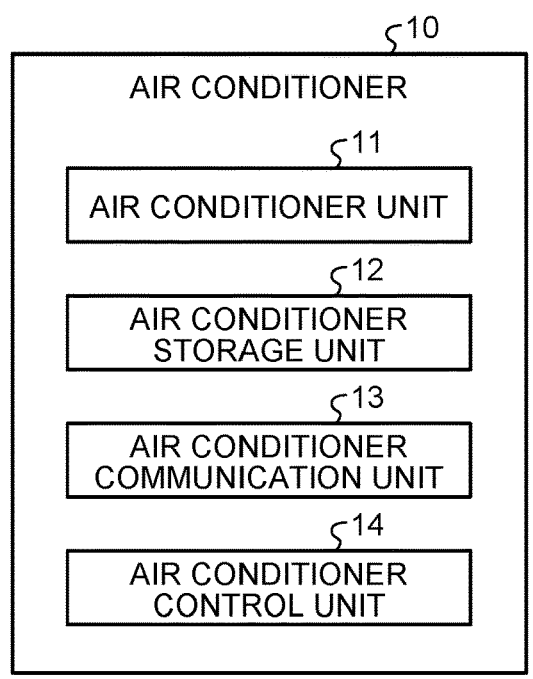
FIG. 2 is a block diagram illustrating a configuration of an air conditioner in the air conditioning control system according to the first embodiment.

FIG. 2 is a block diagram illustrating a configuration of the air conditioner 10 in the air conditioning control system 1 according to the first embodiment. The air conditioner 10 basically has functions of a general air conditioner, and performs air conditioning of a room that is a space to be air conditioned by the air conditioner 10. The air conditioner 10 includes an air conditioner unit 11, an air conditioner storage unit 12, an air conditioner communication unit 13, and an air conditioner control unit 14. The components of the air conditioner 10 above can exchange information with one another.

The air conditioner unit 11 has an air conditioning function and a configuration of a general air conditioner. The air conditioner unit 11 includes a refrigerant circuit through which a refrigerant flows, a compressor that compresses the refrigerant in the refrigerant circuit, a heat exchanger that exchanges heat between air inside the room and the refrigerant flowing in the refrigerant circuit, a blower fan that sends conditioned air subjected to heat exchange in the heat exchanger into the room, a wind direction adjusting unit that adjusts a direction in which the conditioned air is sent, an outdoor heat exchanger that exchanges heat between air outside the room and the refrigerant flowing in the refrigerant circuit, and the like.

The air conditioner storage unit 12 is a storage unit that stores various types of information inside the air conditioner 10. The air conditioner storage unit 12 stores various types of information used for the operation of the air conditioner 10 including the control instruction information that is transmitted from the operation terminal 20 and used to control the operation of the air conditioner 10. The air conditioner storage unit 12 also stores a control program used to control the operation of the air conditioner 10.

The air conditioner communication unit 13 is connected to the Internet 40 to communicate with the operation terminal 20. Moreover, the air conditioner communication unit 13 is connected to the Internet 40 to communicate with the server 30.

The air conditioner control unit 14 controls the overall processing of the air conditioner 10. The air conditioner control unit 14 controls an operation of the air conditioner unit 11 to control the operation of the air conditioner 10. The air conditioner control unit 14 then controls the operation of the air conditioner 10 in accordance with the control instruction information transmitted from the operation terminal 20.

The air conditioner 10 may be a split air conditioner including an indoor unit disposed indoors and an outdoor unit disposed outdoors, or may be an integrated air conditioner.

The operation terminal 20 transmits the control instruction information for controlling the operation of the air conditioner 10 to the air conditioner 10. The operation terminal 20 is connected to the Internet 40 to be able to transmit and receive information to and from the air conditioner 10. As a result, the operation terminal 20 can transmit various types of information input to the operation terminal 20, including the control instruction information for controlling the operation of the air conditioner 10, to the air conditioner 10 via the Internet 40.

Moreover, the operation terminal 20 is connected to the Internet 40 to be able to transmit and receive information to and from the server 30. As a result, the operation terminal 20 can acquire various types of information such as information on an operating state of the air conditioner 10 from the server 30 via the Internet 40.

Figure 3:
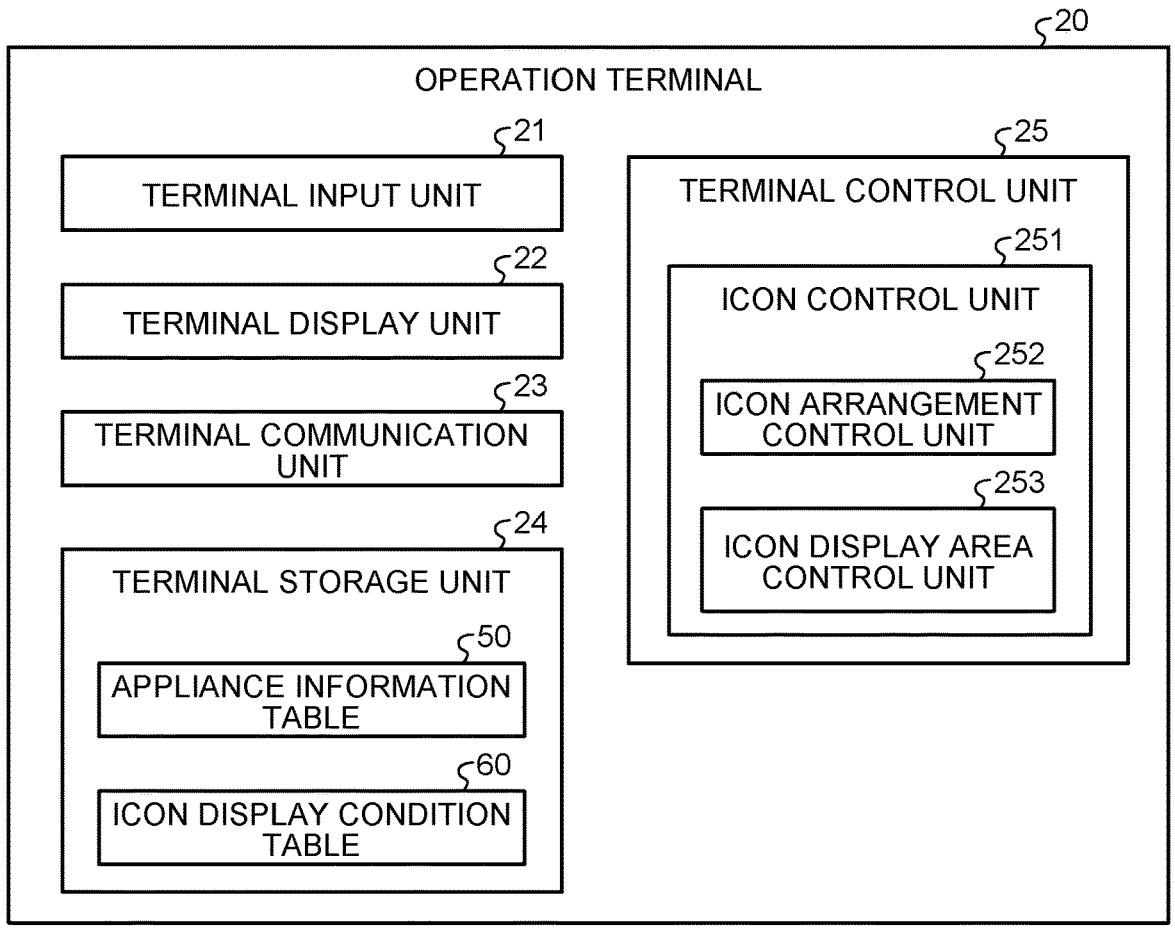
FIG. 3 is a block diagram illustrating a configuration of an operation terminal in the air conditioning control system according to the first embodiment.

FIG. 3 is a block diagram illustrating a configuration of the operation terminal 20 in the air conditioning control system 1 according to the first embodiment. The operation terminal 20 transmits various types of information such as the control instruction information for controlling the operation of the air conditioner 10 to the air conditioner 10 on the basis of an operation on the operation terminal 20 by a user, and remotely controls the operation of the air conditioner 10. That is, the operation terminal 20 transmits, to the air conditioner 10, various types of information input to the operation terminal 20 by a user such as the control instruction information for controlling the operation of the air conditioner 10, and controls the operation of the air conditioner 10. As the operation terminal 20, a portable communication terminal that can be carried by a user, such as a smartphone, can be used.

The operation terminal 20 includes a terminal input unit 21, a terminal display unit 22, a terminal communication unit 23, a terminal storage unit 24, and a terminal control unit 25. The components of the operation terminal 20 above can exchange information with one another.

The terminal input unit 21 is an operation receiving unit that receives a user operation, that is, a setting operation from a user. The setting operation from a user includes an operation for controlling the operation terminal 20 and a setting operation for controlling the operation of the air conditioner 10. The terminal input unit 21 receives input of the user operation and transmits information corresponding to the user operation to the terminal control unit 25. The terminal input unit 21 includes an input device such as a keyboard, a mouse, or a touch panel display with a touch panel function, and receives the user operation for the operation terminal 20. In the first embodiment, the terminal input unit 21 includes a touch panel display.

The terminal display unit 22 is a display unit that displays various types of information inside the operation terminal 20. The terminal display unit 22 displays an operation screen on which the setting operation for controlling the operation of the air conditioner 10 is performed, and also displays information for controlling the operation of the air conditioner 10. That is, the terminal display unit 22 displays the operation screen on which the setting operation for controlling the operation of the air conditioner 10 is selected. Note that the operation screen can be rephrased as a control screen for controlling the operation of the air conditioner 10. The information for controlling the operation of the air conditioner 10 is, for example, the information on the operating state of the air conditioner 10.

In the first embodiment, the terminal display unit 22 includes a touch panel display. On the touch panel display of the terminal display unit 22, one can perform operations generally performed on a touch panel display such as a touch operation of touching a screen with a finger, a tap operation of tapping a screen once with a finger, a double tap operation of tapping a screen twice with a finger, and a drag operation of moving an icon or the like to a desired position with a finger.

In addition, the terminal display unit 22 including the touch panel display operably displays operation icons. The operation icons are icons corresponding to functions that allow control of the operation of the air conditioner 10 by the operation terminal 20. Therefore, the operation icons can be rephrased as icons specifying functions that allow the operation terminal 20 to control the control-target-appliance. Moreover, the operation icons individually correspond to a plurality of functions of the air conditioner 10 in association with the control instruction information instructing execution of the functions.

The terminal communication unit 23 is connected to the Internet 40 to communicate with the air conditioner 10. Moreover, the terminal communication unit 23 is connected to the Internet 40 to communicate with the server 30. The terminal communication unit 23 transmits various types of information transmitted from the air conditioner 10 and the server 30 to the terminal control unit 25. The terminal communication unit 23 transmits the control instruction information for air conditioning transmitted from the terminal control unit 25 to the air conditioner 10.

The terminal storage unit 24 is a storage unit that stores various types of information inside the operation terminal 20. The terminal storage unit 24 stores various types of information transmitted from the air conditioner 10 and the server 30. The terminal storage unit 24 stores an appliance information table 50 to be described later and an icon display condition table 60 to be described later.

The operation terminal 20 includes air conditioning control application software for the operation terminal 20 that is application software for executing an appliance-control-function used to control the operation of the air conditioner 10. The appliance-control-function is specifically a function used on the operation terminal 20 to set an operating condition of the air conditioner 10 and transmit the operating condition to the air conditioner 10. The air conditioning control application software is stored in the terminal storage unit 24. Note that the air conditioning control application software for the operation terminal 20 can be rephrased as home appliance control application software for executing the appliance-control-function that is the function used to set an operating condition of a home appliance and transmit the operating condition to the home appliance. Hereinafter, the air conditioning control application software may be simply referred to as an application.

The terminal control unit 25 is a control unit that controls the overall processing of the operation terminal 20. The terminal control unit 25 controls to store the various types of information transmitted from the terminal communication unit 23 in the terminal storage unit 24. The terminal control unit 25 also controls to display the various types of information transmitted from the terminal communication unit 23 on the terminal display unit 22.

The terminal control unit 25 executes the application stored in the terminal storage unit 24 to provide control to display information for controlling the operation of the air conditioner 10 on the touch panel display, which is the terminal display unit 22, and allow allows a user to perform an operation thereon. Specifically, the terminal control unit 25 provides control to display an operation screen, which displays an operation icon indicating a function for controlling the operation of the air conditioner 10, on the touch panel display that is the terminal display unit 22, and allows a user to perform an operation thereon.

The terminal control unit 25 connects to a web page of a manufacturer or the like of the air conditioner 10 via the terminal communication unit 23, and performs control to download an application for controlling the operation of the air conditioner 10. The terminal control unit 25 controls to store the downloaded application in the terminal storage unit 24.

When a normal operation that is an operation for controlling the operation of the air conditioner 10 is performed on the touch panel display, the terminal control unit 25 recognizes the content of operation of the normal operation, generates control instruction information corresponding to the content of operation, and transmits the control instruction information to the air conditioner 10 via the terminal communication unit 23. The air conditioner 10 receives the control instruction information transmitted from the terminal control unit 25, and the air conditioner control unit 14 controls the operation of the air conditioner 10 on the basis of the control instruction information.

In addition, the terminal control unit 25 includes an icon control unit 251. The icon control unit 251 is a control unit that controls display of an operation icon on the terminal display unit 22. The icon control unit 251 includes an icon arrangement control unit 252 and an icon display area control unit 253. The icon arrangement control unit 252 is a control unit that determines the arrangement of an operation icon on the terminal display unit 22, that is, the display position of the operation icon on the terminal display unit 22, thereby controlling the display of the operation icon. The icon display area control unit 253 is a control unit that controls a display area of an operation icon on the terminal display unit 22.

Figure 4:
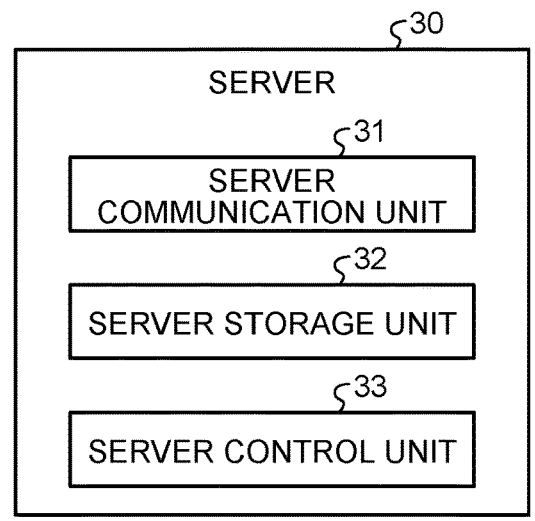
FIG. 4 is a block diagram illustrating a configuration of a server in the air conditioning control system according to the first embodiment.

FIG. 4 is a block diagram illustrating a configuration of the server 30 in the air conditioning control system 1 according to the first embodiment. The server 30 receives information on an operating state of the air conditioner 10 from the air conditioner 10 communicably connected via the Internet 40. That is, the server 30 can acquire the information on the operating state of the air conditioner 10 from the air conditioner 10 via the Internet 40. The server 30 thus shares the information on the operating state of the air conditioner 10 with the air conditioner 10. The server 30 can then transmit the information on the operating state of the air conditioner 10 acquired from the air conditioner 10 to the operation terminal 20 via the Internet 40. As the server 30, a cloud server or a physical server can be used.

The server 30 includes a server communication unit 31, a server storage unit 32, and a server control unit 33. The components of the server 30 above can exchange information with one another.

The server communication unit 31 is connected to the Internet 40 to communicate with the air conditioner 10. Moreover, the server communication unit 31 is connected to the Internet 40 to communicate with the operation terminal 20.

The server storage unit 32 stores various types of information such as the information on the operating state of the air conditioner 10 acquired from the air conditioner 10.

The server control unit 33 controls the overall processing of the server 30. Moreover, the server control unit 33 performs control to acquire the information on the operating state of the air conditioner 10 from the air conditioner 10 and store the information in the server storage unit 32. The server control unit 33 further performs control to transmit the information on the operating state of the air conditioner 10 to the operation terminal 20 via the Internet 40.

Figure 5:
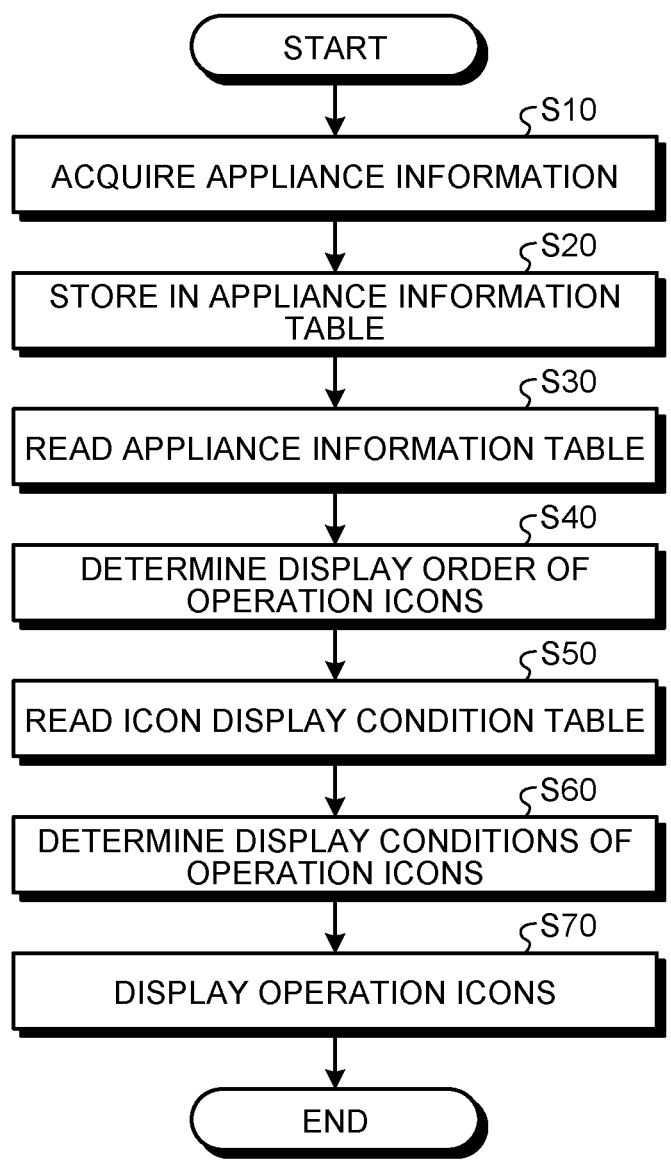
FIG. 5 is a flowchart illustrating a procedure of operation of screen update processing on the operation terminal of the air conditioning control system according to the first embodiment.

Next, an operation of the air conditioning control system 1 will be described. FIG. 5 is a flowchart illustrating a procedure of operation of screen update processing on the operation terminal 20 of the air conditioning control system 1 according to the first embodiment.

First, a user operates the terminal input unit 21 to start an application. Once the application is started, the terminal control unit 25 executes the screen update processing. The screen update processing is processing of updating display positions of operation icons corresponding to functions that allow control of the control-target-appliance by the operation terminal 20 in an icon display area 221 of an operation screen displayed on the terminal display unit 22. That is, the screen update processing is processing of updating an order of arrangement of operation icons in the icon display area 221 of the operation screen. The icon display area 221 will be described later.

In step S10, the icon arrangement control unit 252 acquires, from the air conditioner 10, appliance information of the air conditioner 10 whose operation is to be controlled by the operation terminal 20. The appliance information is information held by the air conditioner 10 and including information on the name of a function for controlling the operation of the air conditioner 10 and function-state-information that is information on the current state of each function for controlling the operation of the air conditioner 10.

In step S20, the icon arrangement control unit 252 controls to store the appliance information acquired from the air conditioner 10 in the appliance information table 50 and the icon display condition table 60 in the terminal storage unit 24. As a result, the appliance information of the air conditioner 10, which is the control-target-appliance, is stored in the appliance information table 50 and the icon display condition table 60.

Figures 6, 7:
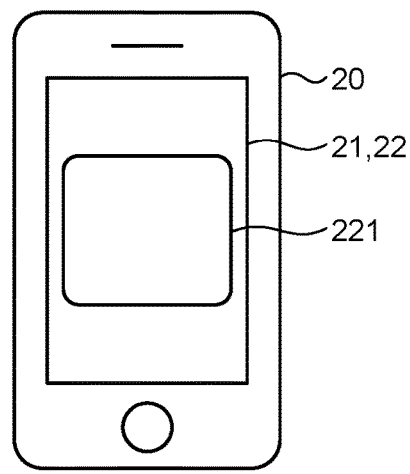
FIG. 6 is a table illustrating an example of an appliance information table stored in a terminal storage unit of the operation terminal in the air conditioning control system according to the first embodiment.
FIG. 7 is a diagram illustrating an icon display area of an operation screen displayed on a terminal display unit of the operation terminal in the air conditioning control system according to the first embodiment.

FIG. 6 is a table illustrating an example of the appliance information table 50 stored in the terminal storage unit 24 of the operation terminal 20 in the air conditioning control system 1 according to the first embodiment. The appliance information table 50 is a first table stored in the terminal storage unit 24, and is a table that stores the appliance information of the air conditioner 10 whose operation is to be controlled by the operation terminal 20. It can be said that the appliance information table 50 includes a list of functions that allow control of the control-target-appliance by the operation terminal 20 and a list of functions of the air conditioner 10 that is the current target appliance controlled by the operation terminal 20.

The appliance information table 50 includes a management number field 51, a function field 52, a function availability field 53, a function state field 54, an icon icon-display-position-setting-value field 55, and a number of times of operation field 56.

The management number field 51 sets a management number.

The function field 52 sets and manages a name of a function that allows control of the control-target-appliance by the operation terminal 20. Specifically, the function field 52 sets and manages a name of a function that allows control of the operation of the control-target-appliance by the appliance-control-function of the operation terminal 20. The name of the function set in the function field 52 is not necessarily limited to the function of the air conditioner 10 that is the control-target-appliance whose operation is currently controlled by the operation terminal 20. Therefore, in some cases, a function that is not included in the air conditioner 10 whose operation is currently controlled by the operation terminal 20, may be registered as the function that allows the appliance-control-function of the operation terminal 20 to control operation of target appliances.

That is, the operation terminal 20 can control the operation of not just one type of the air conditioner 10 as the control-target-appliance, but can individually control operation of a plurality of types of the air conditioners 10 of different manufacturers and specifications, as the control-target-appliances. The operation terminal 20 downloads an application for controlling the operation of the air conditioner 10 for each air conditioner 10 that corresponds to the control-target-appliance. Then, the operation terminal 20 executes the application corresponding to the air conditioner 10 that is the control-target-appliance, and thus can control the operation of the air conditioner 10 for each air conditioner 10 that is the control-target-appliance.

The function availability field 53 sets and manages the availability of a function included in the control-target-appliance whose operation is currently controlled by the operation terminal 20. In FIG. 6, the availabilities of functions included in the air conditioner 10 are set and managed. In FIG. 6, "yes" in the function availability field 53 indicates that a function that is included in the operation terminal 20 and allows control of the target appliance, is included in the air conditioner 10 whose operation is currently controlled by the operation terminal 20. In FIG. 6, "no" in the function availability field 53 indicates that a function that is included in the operation terminal 20 and allows control of the target appliance is not included in the air conditioner 10 whose operation is currently controlled by the operation terminal 20. The function availability field 53 is set on the basis of a setting value included in the appliance information of the air conditioner 10, which is acquired from the air conditioner 10.

The function state field 54 sets and manages function-state-information that is information on a current state of a function that allows the operation terminal 20 to control the control-target-appliance. That is, the function state field 54 manages function-state-information indicating whether a function that allows the operation terminal 20 to control the control-target-appliance is in an active state or an inactive state. The function state field 54 is set on the basis of a setting value included in the appliance information of the air conditioner 10, which is acquired from the air conditioner 10.

The icon display-position-setting-value field 55 sets and manages a display-position-setting-value that is a setting value indicating a display position of an operation icon on the terminal display unit 22. More specifically, the display-position-setting-value in the icon display-position-setting-value field 55 is a setting value indicating a display position of an operation icon in the icon display area 221 of an operation screen displayed on the terminal display unit 22.

The operation icon displayed on the terminal display unit 22 can be moved to an arbitrary display position on the terminal display unit 22 by a user operating the touch panel display of the terminal display unit 22. That is, a user can rearrange the operation icon displayed on the terminal display unit 22 to an arbitrary display position by performing, on the touch panel display, an operation of rearranging operation icon that is an operation of instructing the rearrangement of the operation icon displayed on the terminal display unit 22 to the arbitrary display position. The user can rearrange the operation icon to the arbitrary display position on the terminal display unit 22 by a drag operation, for example. The operation of rearranging operation icon can be rephrased as an operation of changing display order of icon in which the user changes the display order that is the order of the display position of an operation icon in the icon display area 221.

Then, in response to the operation of rearranging operation icon, that is, the operation of changing display order of icon, the icon arrangement control unit 252 determines the display position of the operation icon on the terminal display unit 22, changes the display order of the operation icon on the terminal display unit 22, and rearranges the operation icon on the terminal display unit 22 in the changed display order of the operation icon. When the operation icon on the terminal display unit 22 is rearranged, the icon arrangement control unit 252 sets, in the icon-display-position-setting-value field 55, a display-position-setting-value corresponding to the display position at which the rearranged operation icon is displayed, and controls to store the display-position-setting-value in the appliance information table 50. Where the display-position-setting-value has already been set in the icon-display-position-setting-value field 55, the display-position-setting-value is updated. As a result, on the basis of the operation of rearranging operation icon performed by the user on the operation terminal 20, the display-position-setting-value corresponding to the display position of the operation icon rearranged by the user is automatically stored in the icon-display-position-setting-value field 55.

The number of times of operation field 56 sets and manages the number of times a user performs an operation of selecting a function that allows control of the control-target-appliance by the operation terminal 20 on the operation screen. That is, the number of times of operation is the number of times an operation icon is operated on the operation screen in a predetermined period. The number of times of operation can also be rephrased as the number of times control instruction information associated with an operation icon is transmitted from the operation terminal 20 to the air conditioner 10 based on the operation of the operation icon. Moreover, the number of times of operation can be rephrased as information on relationship of how large or small a selection count is, which is information on relationship of how large or small the number of selections of each operation icon is, among a plurality of operation icons. The terminal control unit 25 counts up the number of times of operation for each operation icon and, every time a user operates an operation icon, updates the information on the number of times of operation stored in the number of times of operation field 56 of the appliance information table 50 for the operation icon operated.

The predetermined period may be a specific period going back to the past from the present, or may be a period from when the control of the air conditioner 10 by the operation terminal 20 is first started to the present, and is stored in the terminal storage unit 24. The predetermined period can be set to any period by a user on the operation terminal 20.

As described above, in the appliance information table 50 illustrated in FIG. 6, the function availability field 53 and the function state field 54 receive input of the setting values included in the appliance information acquired from the control-target-appliance. Also, in the appliance information table 50 illustrated in FIG. 6, the icon-display-position-setting-value field 55 receives input of the display-position-setting-value accompanying the operation of rearranging operation icon, that is, the operation of changing display order of icon by a user. Moreover, in the appliance information table 50 illustrated in FIG. 6, the number of times of operation field 56 receives input of the number of times the operation icon is selected accompanying the operation of selecting the operation icon by a user.

In step S30, the icon arrangement control unit 252 reads information stored in the appliance information table 50 of the terminal storage unit 24. Specifically, the icon arrangement control unit 252 reads information on each function included in the air conditioner 10. The function included in the air conditioner 10 is the function for which "yes" is set in the function availability field 53, among the functions set in the function field 52 of the appliance information table 50. The icon arrangement control unit 252 also reads the number of times of operation set in the number of times of operation field 56. Moreover, where the display-position-setting-value is set in the icon-display-position-setting-value field 55, the icon arrangement control unit 252 reads the number of times of operation set in the number of times of operation field 56 and the display-position-setting-value set in the icon-display-position-setting-value field 55.

In step S40, on the basis of the information read from the appliance information table 50 in the terminal storage unit 24, the icon arrangement control unit 252 determines the display order of operation icons in the icon display area 221 of the operation screen displayed on the terminal display unit 22.

Where the display-position-setting-values has not been read from the appliance information table 50 but the number of times of operation has been read from the appliance information table 50 in step S30, the icon arrangement control unit 252 determines the display order of the operation icons corresponding to the functions included in the air conditioner 10 based on the number of times of operation that have been read. Specifically, the icon arrangement control unit 252 determines the display order of the operation icons corresponding to the functions in descending order of the number of times of operation.

The icon arrangement control unit 252 determines the display order of the operation icons on the terminal display unit 22 such that an operation icon with a higher number of times of operation is placed at a higher display position in the order of predetermined display positions in the icon display area 221. The icon arrangement control unit 252 determines the display order of the operation icons such that an operation icon with a lower number of times of operation is placed at a lower display position in the order of the predetermined display positions in the icon display area 221. It can be said that the operation icon with a low number of times of operation is the operation icon indicating a function whose use count and use frequency by a user are low.

Where the number of times of operation and the display-position-setting-values have been read from the appliance information table 50 in step S30, the icon arrangement control unit 252 determines the display order of the operation icons corresponding to the functions included in the air conditioner 10 based on the display-position-setting-values and the number of times of operation that have been read.

Specifically, the icon arrangement control unit 252 first determines the display position of the operation icon corresponding to the function whose display-position-setting-value has been read, based on the display-position-setting-value. The icon arrangement control unit 252 determines the display position of the operation icon corresponding to each function by using the display position on the terminal display unit 22 associated with the display-position-setting-value corresponding to each function as the display position of the operation icon corresponding to each function.

Next, the icon arrangement control unit 252 determines, based on the number of times of operation, the display position of the operation icon corresponding to the function whose display-position-setting-value has not been read among the functions included in the air conditioner 10. The icon arrangement control unit 252 determines the positions on the terminal display unit 22 for displaying the operation icons that correspond to the functions in descending order of the number of times of operation read from the appliance information table 50. That is, the icon arrangement control unit 252 determines the display positions of the operation icons corresponding to the functions in descending order of the use frequency by a user. In this determination, the display position of the operation icon determined based on the display-position-setting-value as described above is excluded.

The above processing determines the display order, in the icon display area 221, of the operation icons corresponding to the functions included in the air conditioner 10. That is, the icon arrangement control unit 252 determines the display order of the operation icons corresponding to the functions included in the air conditioner 10 basically on the basis of the number of times of operation. Where the number of times of operation and the display-position-setting-values have been read from the appliance information table 50 in step S30, the icon arrangement control unit 252 determines the display order of the operation icons corresponding to the functions included in the air conditioner 10 by preferentially using the display-position-setting-values rather than the number of times of operation.

Therefore, where the display-position-setting-values are set in the icon-display-position-setting-value field 55, the icon arrangement control unit 252 determines the display order of the operation icons corresponding to the functions included in the air conditioner 10 by prioritizing the display-position-setting-values over the number of times of operation.

Figures 8, 9:
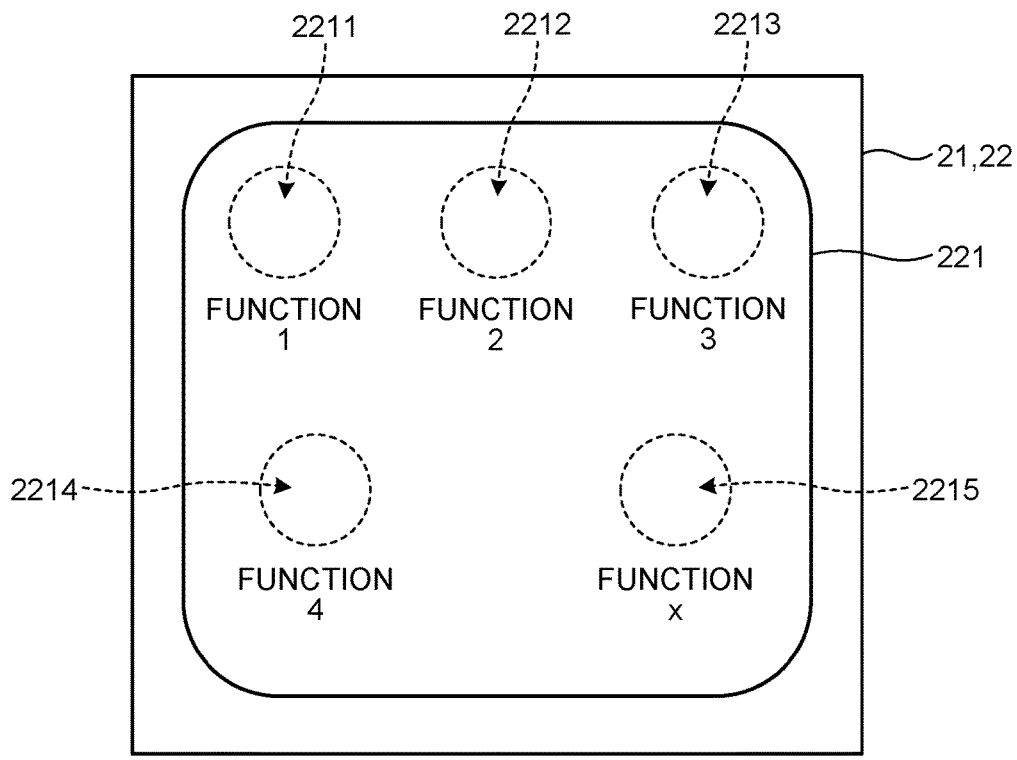
FIG. 8 is an enlarged view of the icon display area of the operation screen displayed on the terminal display unit illustrated in FIG. 7.
FIG. 9 is a table illustrating an example of an icon display condition table stored in the terminal storage unit of the operation terminal in the air conditioning control system according to the first embodiment.

FIG. 7 is a diagram illustrating the icon display area 221 of the operation screen displayed on the terminal display unit 22 of the operation terminal 20 in the air conditioning control system 1 according to the first embodiment. FIG. 8 is an enlarged view of the icon display area 221 of the operation screen displayed on the terminal display unit 22 illustrated in FIG. 7. For the icon display area 221, the order of display positions at which operation icons are displayed is determined. In FIG. 8, a first display position 2211 is a first display position in the display order in the icon display area 221. A second display position 2212 is a second display position in the display order in the icon display area 221. A third display position 2213 is a third display position in the display order in the icon display area 221. A fourth display position 2214 is a fourth display position in the display order in the icon display area 221. A fifth display position 2215 is a fifth display position in the display order in the icon display area 221.

The display position in the icon display area 221 corresponds to the display-position-setting-value set in the icon-display-position-setting-value field 55. That is, the display-position-setting-value of "1" corresponds to the first display position 2211. The display-position-setting-value of "2" corresponds to the second display position 2212. The display-position-setting-value of "3" corresponds to the third display position 2213. The display-position-setting-value of "4" corresponds to the fourth display position 2214. The display-position-setting-value of "5" corresponds to the fifth display position 2215. Note that the order of the display positions at which the operation icons are displayed in the icon display area 221 can be changed in any way by a user.

Moreover, when the display order of the operation icons is determined in descending order of the number of times of operation read from the appliance information table 50, the display positions of the operation icons are determined to be the first display position 2211, the second display position 2212, the third display position 2213, the fourth display position 2214, and the fifth display position 2215 in this order starting from the 20 operation icon corresponding to the function with the number of times of operation read.

In step S50, the icon arrangement control unit 252 reads information stored in the icon display condition table 60 of the terminal storage unit 24. Specifically, the icon arrangement control unit 252 reads display conditions of the operation icons from the icon display condition table 60. FIG. 9 is a table illustrating an example of the icon display condition table 60 stored in the terminal storage unit 24 of the operation terminal 20 in the air conditioning control system 1 according to the first embodiment.

The icon display condition table 60 is a second table stored in the terminal storage unit 24, and is a table that stores display conditions of the operation icons displayed in the icon display area 221 of the operation screen. The display conditions of the operation icons include icon color and icon text. The icon color is the color of the operation icon to be displayed in the icon display area 221. The icon text is text information describing the content of the operation icon accompanying the operation icon, and is text information displayed in the icon display area 221 together with the operation icon. As the icon text, for example, a name of a function for controlling the operation of the air conditioner 10 is used.

The icon display condition table 60 includes a management number field 61, a function field 62, a function availability field 63, a function state field 64, an icon color field 65, and an icon text field 66.

The content of the management number field 61 is similar to that of the management number field 51 in the appliance information table 50. The content of the function field 62 is similar to that of the function field 52 in the appliance information table 50. The content of the function availability field 63 is similar to that of the function availability field 53 in the appliance information table 50. The content of the function state field 64 is similar to that of the function state field 54 in the appliance information table 50.

The icon color field 65 sets and manages the icon color. The icon color field 65 receives input of a setting value input to the operation terminal 20 via a user's operation on the terminal input unit 21. The icon color is set in an RGB format such as RGB (0, 0, 0), RGB (128, 128, 128), or RGB (192, 192, 192) as illustrated in FIG. 9.

The icon text field 66 sets and manages information on whether or not the icon text is displayed, that is, information on whether or not the icon text is displayed in the icon display area 221 together with the operation icon. That is, the icon display condition table 60 stores display-availability-information, which is the information on whether or not the icon text is displayed in the icon display area 221, in the icon text field 66 for each function.

In FIG. 9, "on" in the icon text field 66 indicates that the icon text is displayed in the icon display area 221. In FIG. 9, "off" in the icon text field 66 indicates that the icon text is not displayed in the icon display area 221. In FIG. 9, "unsupported" in the icon text field 66 indicates that the air conditioner 10 whose operation is currently to be controlled by the operation terminal 20 does not include a function that is included in the operation terminal 20 and allows control of the control-target-appliance, and thus the icon arrangement control unit 252 cannot execute the icon text display function.

In step S60, the icon arrangement control unit 252 determines the display conditions of the operation icons. Specifically, on the basis of the display conditions of the operation icons read from the icon display condition table 60, the icon arrangement control unit 252 determines the icon color and whether or not the icon text is displayed as the display conditions of the operation icons displayed on the terminal display unit 22.

In step S70, the icon arrangement control unit 252 causes the terminal display unit 22 to display the operation icons based on the display order of the operation icons determined in step S40 and the display conditions of the operation icons determined in step S60. Specifically, the icon arrangement control unit 252 controls to display the operation icons indicating the functions included in the air conditioner 10, in the icon display area 221 of the terminal display unit 22.

As a result, the operation terminal 20 enters a user-operation-receiving-state in which the operation terminal 20 receives an input from a user.

In the processing described above, the terminal display unit 22 can be said to be a display unit that displays, for a plurality of functions included in a home appliance, a plurality of operation icons individually corresponding to the functions included in the home appliance in association with the control instruction information that instructs execution of the functions included in the home appliance.

Moreover, in the processing described above, with the operation of rearranging operation icon performed by the user, the display-position-setting-values that are input from the outside of the operation terminal 20 and indicate the display positions of the plurality of operation icons are set in the appliance information table 50. Therefore, in the processing described above, the terminal storage unit 24 can be said to be a storage unit that stores at least one of the information on relationship of how large or small the selection count is, which is the information on relationship of how large or small the number of selections of each of the plurality of operation icon is, and the display-position-setting-values that are input from the outside of the operation terminal 20 and indicate the display positions of the plurality of operation icons.

Moreover, the icon arrangement control unit 252 of the icon control unit 251 can be said to be a control unit that controls the display positions of the plurality of operation icons on the terminal display unit 22 based on at least one of the information on relationship of how large or small the selection count is and the display-position-setting-values.

Note that while the appliance-control-function of the operation terminal 20 is active, the terminal control unit 25 acquires the current appliance information of the air conditioner 10 from the air conditioner 10 and repeatedly executes the screen update processing described above. That is, in step S10, the icon arrangement control unit 252 acquires the current appliance information of the air conditioner 10 from the air conditioner 10 at a timing when an updating operation for appliance information is performed by a user and at a predetermined regular timing. The updating operation for appliance information is an operation in which a user instructs the terminal input unit 21 to update the appliance information. The regular timing is a timing of a predetermined interval such as 30 seconds or one minute, for example, and can be set to any period by a user on the operation terminal 20.

In step S20, the icon arrangement control unit 252 updates the setting values in the appliance information table 50 and the setting values in the icon display condition table 60 with the newly acquired current appliance information of the air conditioner 10. That is, the icon control unit 251 updates the function-state-information included in the newly acquired current appliance information of the air conditioner 10. Then, subsequent to the update of the function-state-information, the processing from step S30 to step S70 is performed as described above so that the display of the operation icons in the icon display area 221 of the terminal display unit 22 is updated.

In the operation terminal 20, the operation icons corresponding to the functions included in the air conditioner 10 among the functions that allow control of the control-target-appliance by the operation terminal 20 are arranged and displayed on the terminal display unit 22, whereby a user can intuitively understand operations that can be performed on the air conditioner 10. As a result, the user can easily access the functions included in the air conditioner 10 by operating the operation icons arranged and displayed on the terminal display unit 22.

In the operation terminal 20, with the screen update processing performed as described above, the display positions of the operation icons displayed in the icon display area 221 are the rearranged display positions for the operation icons that have been subjected to the operation of rearranging operation icon by the user. The operation icons not rearranged by the user are displayed at the display positions determined based on the number of times of operation of each operation icon.

That is, the plurality of operation icons displayed on the terminal display unit 22 is arranged at the display positions rearranged as intended by the user and the display positions rearranged in descending order of the number of times of operation, and thus arranged in the order convenient for the user.

Moreover, in the operation terminal 20, the above processing causes each operation icon corresponding to the function of the air conditioner 10, among the functions that allow control of the control-target-appliance by the operation terminal 20, to be displayed in accordance with the information of the icon color and the icon text that are set in the icon display condition table 60 according to the state of each function.

As a result, the display of the color and the icon text of the operation icon corresponding to the function of the air conditioner 10 changes automatically, which makes it easy to intuitively and visually recognize the current state of the function of the air conditioner 10.

A user can thus visually easily and intuitively understand the latest function state of each function included in the air conditioner 10 by viewing the display of the operation icons in the icon display area 221 of the terminal display unit 22.

In addition, the operation icon that has been subjected to the rearrangement operation by the user is displayed at the rearranged display position even after the screen update processing is performed. That is, for the function corresponding to the operation icon that has been subjected to the rearrangement operation by the user, the setting value in the icon-display-position-setting-value field 55 in the appliance information table 50 is retained even after the screen update processing is performed.

For example, a case is assumed where a user wants to check a state of a function by viewing an operation icon even though the number of times of operation thereof by the user is low. In this case, the user rearranges the operation icon of the function, which the user wants to check the state of, at an arbitrary display position in the icon display area 221. As a result, even when the screen update processing is repeatedly performed, the display position of the operation icon rearranged in the icon display area 221 remains unchanged and fixed. Therefore, the user can check the state of the function corresponding to the operation icon whose display position has been rearranged always at the same position in the icon display area 221.

Note that, when it is no longer necessary to fix the display position of the operation icon whose display position in the icon display area 221 is fixed as described above, the fixing of the display position of the operation icon can be released by a user's operation on the operation terminal 20. In this case, in the appliance information table 50, the setting value in the icon display-position-setting-value field 55 for the function corresponding to the operation icon whose display position has been unfixed is deleted. As a result, in the next screen update processing, the display position of the operation icon corresponding to the function whose setting value in the icon-display-position-setting-value field 55 has been deleted is not determined based on the display-position-setting-value.

Although the operation terminal 20 acquires the appliance information from the air conditioner 10 in the case described above, the operation terminal 20 may acquire the appliance information from the server 30.

Figure 10:
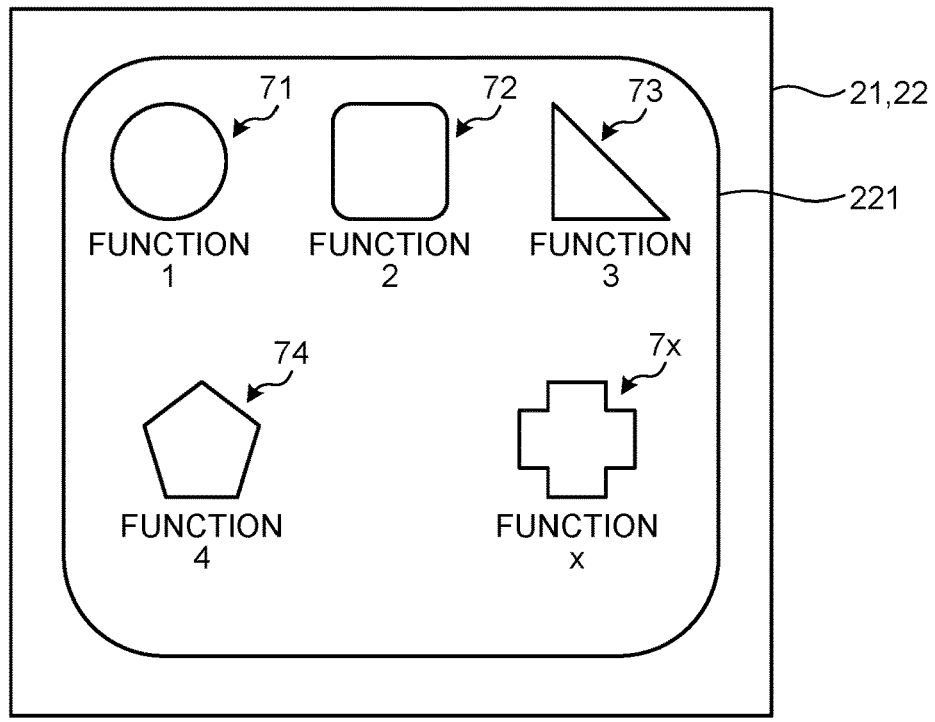
FIG. 10 is a diagram illustrating display states of operation icons before reflecting states of functions in the display of the operation icons in the icon display area of the terminal display unit illustrated in FIG. 7.
Figure 11:
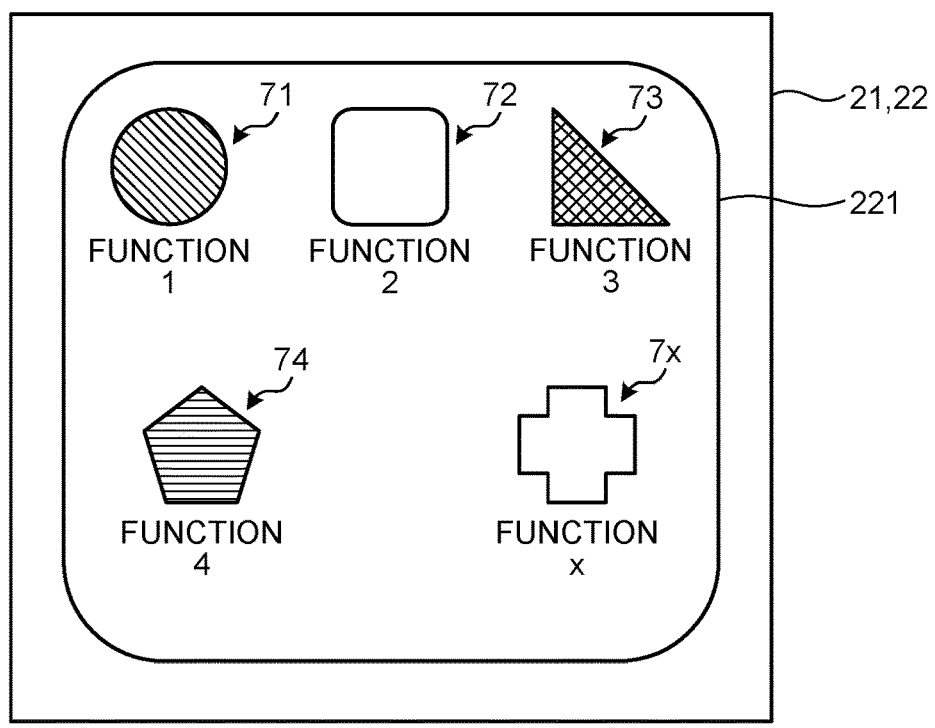
FIG. 11 is a diagram illustrating display states of the operation icons after the states of the functions are reflected in the display of the operation icons in the icon display area of the terminal display unit illustrated in FIG. 7.

FIG. 10 is a diagram illustrating display states of operation icons before reflecting states of functions in the display of the operation icons in the icon display area 221 of the terminal display unit 22 illustrated in FIG. 7. FIG. 11 is a diagram illustrating display states of the operation icons after reflecting the states of the functions in the display of the operation icons in the icon display area 221 of the terminal display unit 22 illustrated in FIG. 7. In FIGS. 10 and 11, an operation icon 71 corresponding to a function 1, an operation icon 72 corresponding to a function 2, an operation icon 73 corresponding to a function 3, an operation icon 74 corresponding to a function 4, and an operation icon 7x corresponding to a function x are displayed in the icon display area 221 of the terminal display unit 22.

The display states of the operation icons are changed from the states of FIG. 10 to the states of FIG. 11 by reflecting the states of the functions in the display of the operation icons in the icon display area 221. When the states of the functions are not reflected in the display of the operation icons, as illustrated in FIG. 10, both the operation icon corresponding to the function that is in an "on" state and the operation icon corresponding to the function that is in an "off" state are not displayed with color, and the shapes of the icons are displayed in the icon display area 221 in white, for example. Thus, a user viewing the display in the icon display area 221 cannot discriminate between the function that is in the "on" state and the function that is in the "off" state.

On the other hand, when the states of the functions are reflected in the display of the operation icons, as illustrated in FIG. 11, the operation icon corresponding to the function that is in the "on" state is hatched. As for the operation icon corresponding to the function that is in the "off" state, the shape of the icon is displayed in white, for example, in FIG. 11 as well without being hatched.

Note that, in FIG. 11, the operation icon corresponding to the function that is in the "on" state is hatched for the sake of illustration. However, on the actual operation terminal 20, the operation icon corresponding to the function that is in the "on" state is displayed in an arbitrary color different from the display state before reflecting the state of the function in the display of the operation icon.

That is, on the terminal display unit 22 of the operation terminal 20, the operation icon corresponding to the function that is in the "on" state is displayed in color, and the operation icon corresponding to the function that is in the "off" state is not displayed in color. This makes it easy for a user to visually and intuitively recognize the function that is in the "on" state and the function that is in the "off" state.

Note that the operation icon corresponding to the function that is in the "on" state need only be displayed in color different from the color of the operation icon corresponding to the function that is in the "off" state. Alternatively, the operation icon corresponding to the function that is in the "on" state and the operation icon corresponding to the function that is in the "off" state may be displayed in shades of the same color so as to be visually distinguishable. For example, the operation icon corresponding to the function that is in the "on" state is displayed in a dark shade of a specific color. Meanwhile, the operation icon corresponding to the function that is in the "off" state is displayed in a light shade of the specific color. In this case as well, it is easy for a user to visually and intuitively recognize whether the function is in the "on" state or is in the "off" state.

Figure 12:
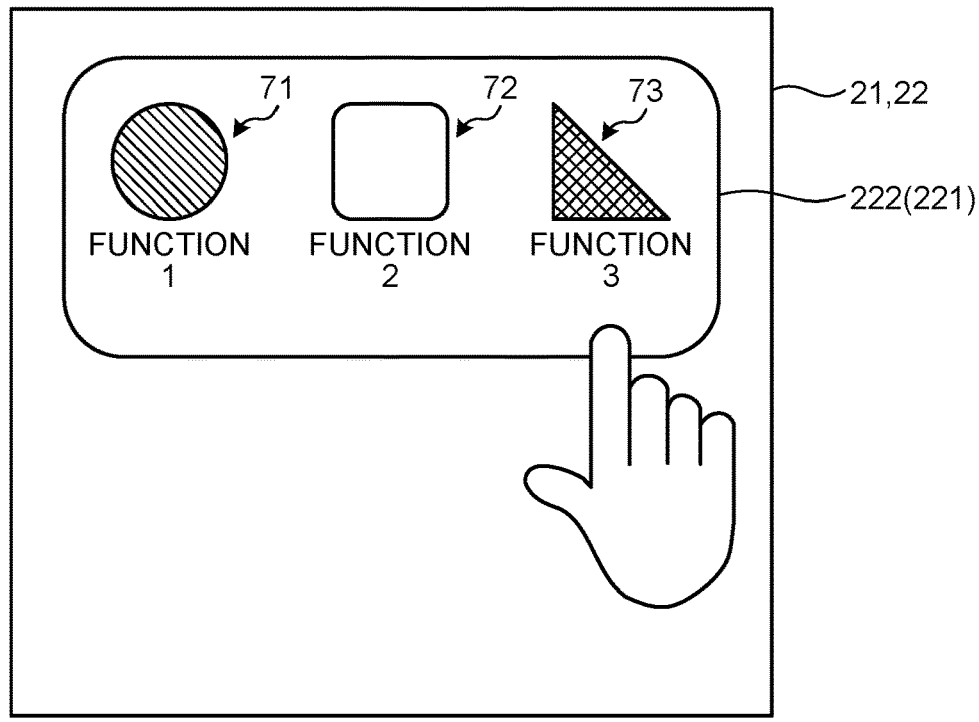
FIG. 12 is a diagram illustrating a state before expanding the icon display area of the operation screen displayed on the terminal display unit illustrated in FIG. 7.
Figure 13:
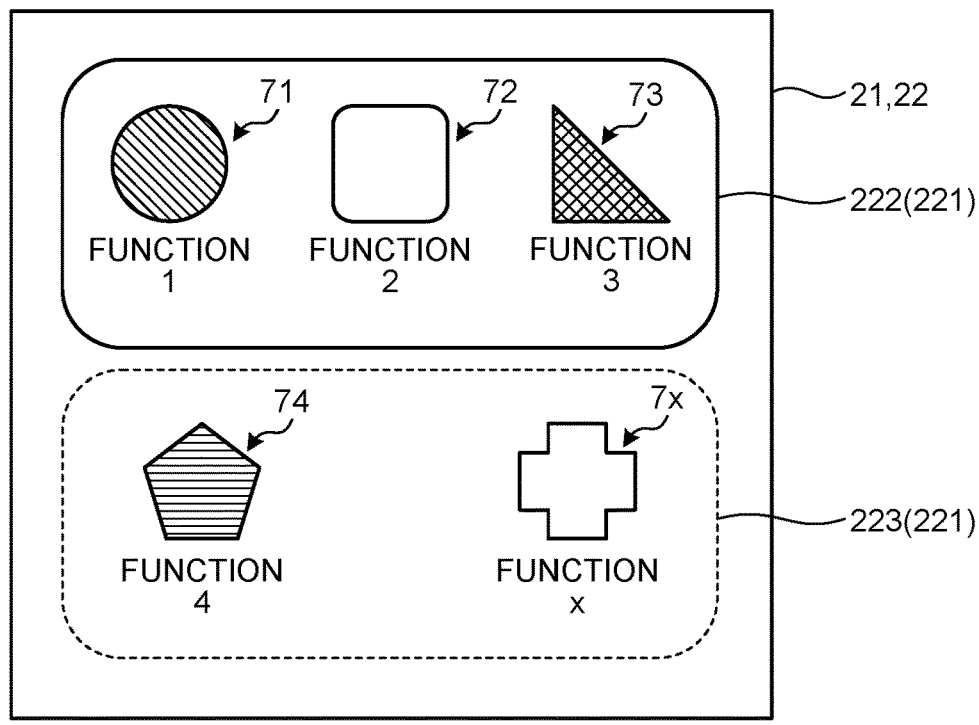
FIG. 13 is a diagram illustrating a state after expanding the icon display area of the operation screen displayed on the terminal display unit illustrated in FIG. 7.

Next, another example of the configuration of the icon display area 221 on the terminal display unit 22 will be described. FIG. 12 is a diagram illustrating a state before expanding the icon display area 221 of the operation screen displayed on the terminal display unit 22 illustrated in FIG. 7. FIG. 13 is a diagram illustrating a state after expanding the icon display area 221 of the operation screen displayed on the terminal display unit 22 illustrated in FIG. 7. The icon display area 221 can include a constant display area 222 that is a first display area in which operation icons are always displayed, and a hidden area 223 that is a second display area in which no operation icon is normally displayed.

When a user performs an operation of dividing display area on the terminal display unit 22 illustrated in FIG. 11, the icon display area 221 including the constant display area 222 and the hidden area 223 can be displayed on the terminal display unit 22 as illustrated in FIGS. 12 and 13. The operation of dividing display area is an operation that instructs processing of dividing the icon display area 221 into the constant display area 222 and the hidden area 223. That is, in response to the operation of dividing display area, the icon display area control unit 253 causes the terminal display unit 22 to display the icon display area 221 including the constant display area 222 and the hidden area 223. The operation of dividing display area is the operation that instructs the processing of dividing the icon display area 221 illustrated in FIG. 11 into the constant display area 222 and the hidden area 223.

Moreover, when a user performs a display area integrating operation on the terminal display unit 22 illustrated in FIGS. 12 and 13, the icon display area 221 illustrated in FIG. 11 can be displayed on the terminal display unit 22. The display area integrating operation is an operation that instructs processing of integrating the constant display area 222 and the hidden area 223 illustrated in FIGS. 12 and 13 into the one icon display area 221 illustrated in FIG. 11.

In FIG. 12, as the icon display area 221, only the constant display area 222 is displayed on the terminal display unit 22 and the state before the icon display area 221 is expanded is illustrated. In FIG. 13, as the icon display area 221, the constant display area 222 and the hidden area 223 are displayed on the terminal display unit 22, and the state after the icon display area 221 is expanded is illustrated.

In the display state illustrated in FIG. 12, when a user performs an icon display area expanding operation as an operation that instructs expansion of the icon display area on the operation terminal 20, the state of the icon display area 221 on the operation screen of the terminal display unit 22 can be changed from the state in which only the constant display area 222 is displayed to the state in which the constant display area 222 and the hidden area 223 are displayed. The user can cause the hidden area 223 to be displayed on the terminal display unit 22 by performing the icon display area expanding operation by, for example, tapping or swiping the touch panel.

Moreover, in the display state illustrated in FIG. 13, when a user performs an icon display area reducing operation as an operation that instructs reduction of the icon display area on the operation terminal 20, the state of the icon display area 221 on the operation screen of the terminal display unit 22 can be changed, from the state in which the constant display area 222 and the hidden area 223 are displayed to the state in which only the constant display area 222 is displayed. The user can cause the hidden area 223 to be hidden on the terminal display unit 22 by performing the icon display area reducing operation by, for example, tapping or swiping the touch panel.

In the example illustrated in FIG. 12, the operation icons in the top three in the display order, which are the operation icon 71 corresponding to the function 1, the operation icon 72 corresponding to the function 2, and the operation icon 73 corresponding to the function 3, are displayed in the constant display area 222. In the example illustrated in FIG. 12, the operation icons ranked fourth and lower in the display order are not displayed on the terminal display unit 22.

On the other hand, in the example illustrated in FIG. 13, the operation icons in the top three in the display order, which are the operation icon 71 corresponding to the function 1, the operation icon 72 corresponding to the function 2, and the operation icon 73 corresponding to the function 3, are displayed in the constant display area 222. Also, in the example illustrated in FIG. 13, the operation icons ranked fourth and lower in the display order, which are the operation icon 74 corresponding to the function 4 and the operation icon 7x corresponding to the function x, are displayed in the hidden area 223. That is, when the hidden area 223 is displayed on the terminal display unit 22 by the operation of expanding the icon display area 221, the operation icons ranked fourth and lower in the display order, which have not been displayed on the terminal display unit 22, are displayed in the hidden area 223. Note that the number of operation icons to be displayed in the constant display area 222 and the number of operation icons to be displayed in the hidden area 223 can be changed at will by a user.

In a case where the number of functions of the air conditioner 10 increases, an operation icon corresponding to a function of the air conditioner 10 with a low use frequency by a user may be displayed in the hidden area 223, so that the user can reduce the chance of falsely operating the operation icon.

Figure 14:
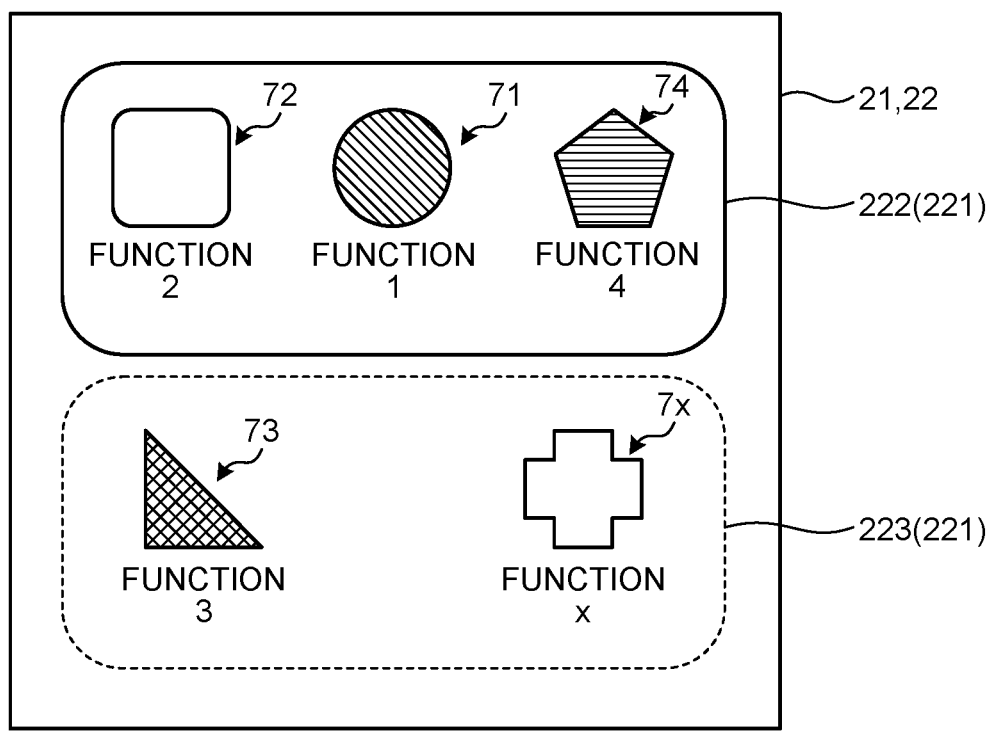
FIG. 14 is a diagram illustrating an example of a state in which display settings of a constant display area and a hidden area as well as rearrangement of the operation icons are performed on the operation screen displayed on the terminal display unit illustrated in FIG. 11.

FIG. 14 is a diagram illustrating an example of a state in which display settings of the constant display area 222 and the hidden area 223 as well as rearrangement of the operation icons are performed on the operation screen displayed on the terminal display unit 22 illustrated in FIG. 11. The display state of the terminal display unit 22 illustrated in FIG. 11 is changed to the display state of the terminal display unit 22 illustrated in FIG. 14 in accordance with the operation of dividing the display area performed by a user on the operation terminal 20 and the operation of rearranging operation icon performed by a user on the operation terminal 20.

Figure 15:
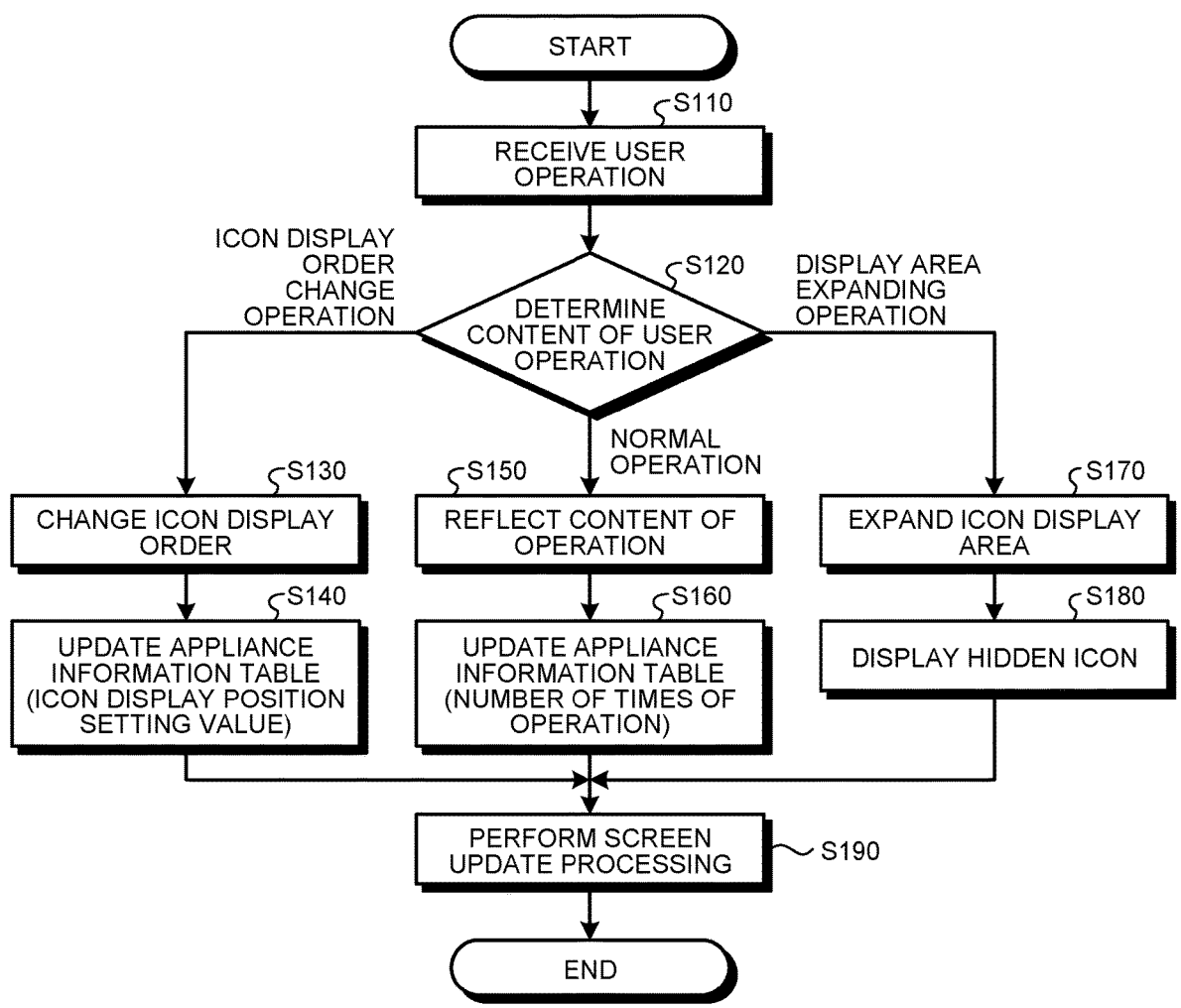
FIG. 15 is a flowchart illustrating a procedure of operation of the operation terminal in the air conditioning control system according to the first embodiment when a user operation is performed while the operation terminal is in a user-operation-receiving-state.

FIG. 15 is a flowchart illustrating a procedure of operation of the operation terminal 20 of the air conditioning control system 1 according to the first embodiment when a user operation is performed while the operation terminal 20 is in the user-operation-receiving-state. Note that, here, the description will be made for the state in which the constant display area 222 is displayed on the terminal display unit 22 as illustrated in FIG. 12 on the basis of the operation of dividing display area.

In step S110, the terminal input unit 21 receives a user operation, that is, a setting operation from a user. The terminal input unit 21 receives the user operation and transmits information corresponding to the user operation to the terminal control unit 25.

In step S120, the terminal control unit 25 determines the content of the user operation on the basis of the information corresponding to the user operation. If it is determined that the content of the user operation is an operation of changing display order of icon, the process proceeds to step S130. If it is determined that the content of the user operation is a normal operation that is a normal operation for controlling the operation of the air conditioner 10, the process proceeds to step S150. If it is determined that the content of the user operation is a display area expanding operation, the process proceeds to step S170.

In step S130, the display order of the operation icons is changed in accordance with the content corresponding to the user operation. That is, on the basis of the operation of changing display order of icon, the icon arrangement control unit 252 changes the display order of the operation icons on the terminal display unit 22 by changing the display positions of the operation icons on the terminal display unit 22. Then, the icon arrangement control unit 252 rearranges the operation icons on the terminal display unit 22 on the basis of the changed display order.

In step S140, the icon arrangement control unit 252 updates the information in the appliance information table 50 by setting, in the icon-display-position-setting-value field 55, display-position-setting-values corresponding to the display positions at which the rearranged operation icons are displayed.

In step S150, the terminal control unit 25 reflects the content of operation. That is, the terminal control unit 25 recognizes the content of operation of the normal operation, generates control instruction information corresponding to the content of operation, and transmits the control instruction information to the air conditioner 10 via the terminal communication unit 23. When the user performs the normal operation via an operation such as tapping an operation icon, the air conditioner 10 is controlled in accordance with the display state of the operation icon. For example, it is assumed that an operation icon of a certain function of the air conditioner 10 displays a state corresponding to an "off" state of the function. Here, when the user taps the operation icon, the terminal control unit 25 controls the air conditioner 10 to turn "on" the function corresponding to the operation icon.

In step S160, the terminal control unit 25 updates the information in the appliance information table 50 by increasing the number of times of operation in the number of times of operation field 56 of the appliance information table 50 by one for the function corresponding to the content of operation.

In step S170, in response to the icon display area expanding operation, the icon display area control unit 253 causes the terminal display unit 22 to display the constant display area 222 and the hidden area 223.

In step S180, the icon arrangement control unit 252 controls to display, in the hidden area 223, a hidden icon that is an operation icon not displayed in the constant display area 222.

Thereafter, in step S190, the screen update processing is performed at a predetermined regular timing to end the series of processing when the user operation is performed while the operation terminal 20 is in the user-operation-receiving-state.

Figure 16:
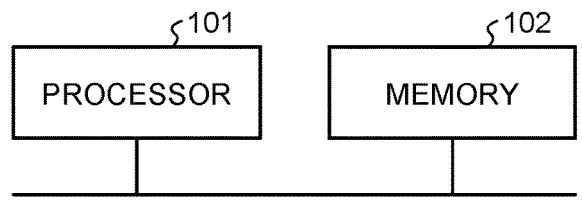
FIG. 16 is a diagram illustrating an example of a hardware configuration of processing circuitry according to the first embodiment.

The air conditioner control unit 14 of the air conditioner 10 and the server control unit 33 of the server 30 are each implemented as processing circuitry including a hardware configuration illustrated in FIG. 16, for example. FIG. 16 is a diagram illustrating an example of the hardware configuration of the processing circuitry according to the first embodiment. When the air conditioner control unit 14 of the air conditioner 10 and the server control unit 33 of the server 30 are each implemented by the processing circuitry illustrated in FIG. 16, the functions of each of the air conditioner control unit 14 of the air conditioner 10 and the server control unit 33 of the server 30 are implemented by a processor 101 executing programs stored in a memory 102. Alternatively, a plurality of processors and a plurality of memories may cooperatively implement the functions of each of the air conditioner control unit 14 of the air conditioner 10 and the server control unit 33 of the server 30. Yet alternatively, some of the functions of each of the air conditioner control unit 14 of the air conditioner 10 and the server control unit 33 of the server 30 may be implemented as an electronic circuit, and the other functions may be implemented by using the processor 101 and the memory 102.

Figure 17:
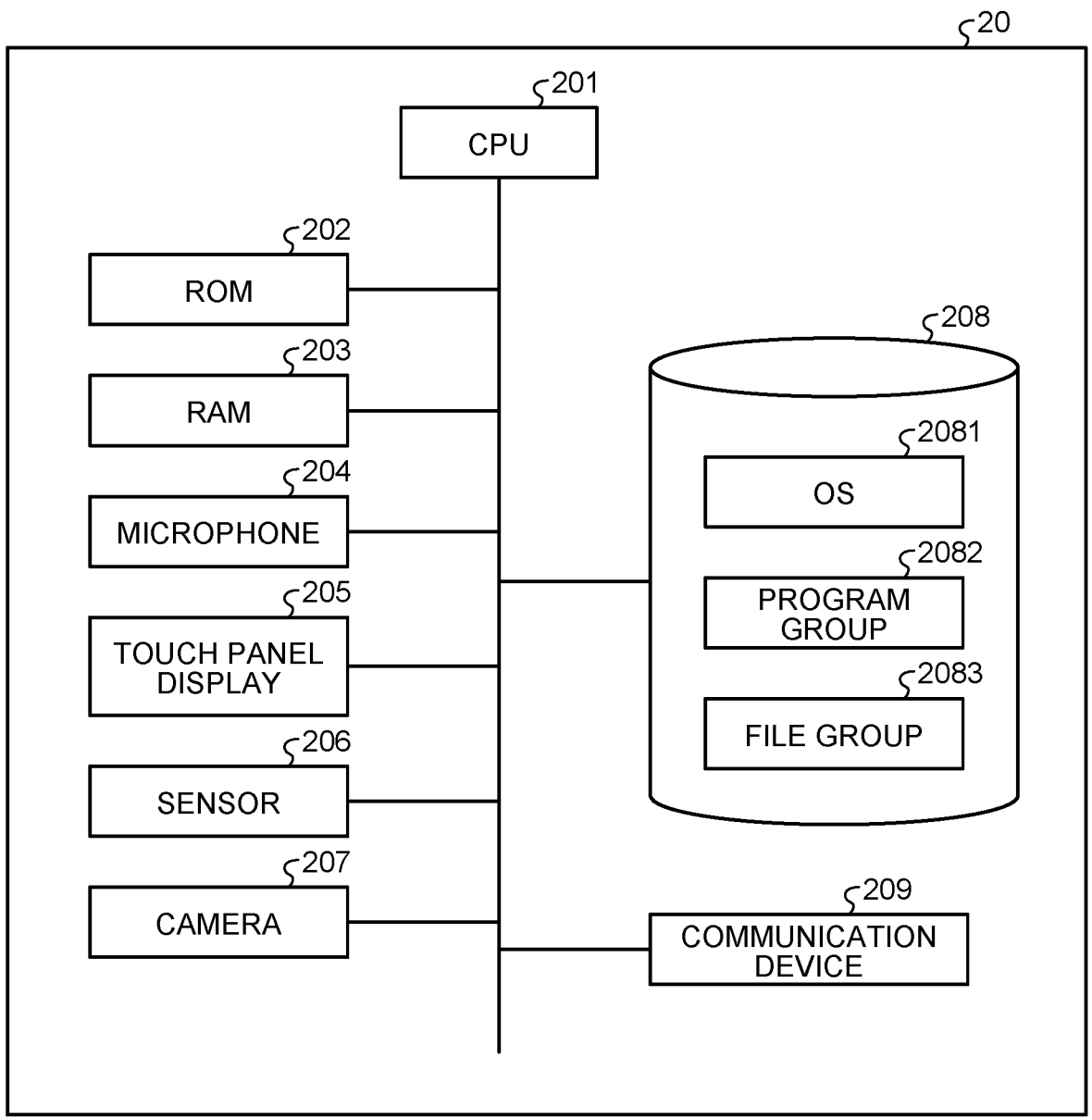
FIG. 17 is a block diagram illustrating an example of a hardware configuration for implementing the operation terminal according to the first embodiment.

On the other hand, FIG. 17 is a block diagram illustrating an example of a hardware configuration for implementing the operation terminal 20 according to the first embodiment. The operation terminal 20 according to the first embodiment includes a central processing unit (CPU) 201, a read only memory (ROM) 202, a random access memory (RAM) 203, a microphone 204, a touch panel display 205, a sensor 206, a camera 207, a built-in memory 208, and a communication device 209. The CPU 201, the ROM 202, the RAM 203, the microphone 204, the touch panel display 205, the sensor 206, the camera 207, the built-in memory 208, and the communication device 209 are connected by a data bus 210.

The CPU 201 is an arithmetic device that executes an operating system (OS) 2081 for controlling the operation of the operation terminal 20 and a program group 2082 that includes various programs. The ROM 202 stores a program executed by the CPU 201 during the operation of the operation terminal 20 in a non-volatile manner. The RAM 203 is a work area used when the CPU 201 executes a program. The microphone 204 detects a sound and allows the detected sound to be stored in the built-in memory 208 as an electrical signal. The built-in memory 208 also stores various data used or acquired in the operation of the operation terminal 20. The touch panel display 205 displays various types of information and receives various operations by a user. The sensor 206 is a sensor used to implement a function of the operation terminal 20 and is, for example, a sensor such as a global positioning system (GPS) sensor, an acceleration sensor, or an optical sensor. The camera 207 is an imaging device used to implement a function of the operation terminal 20. The built-in memory 208 is a device that stores the OS 2081, the program group 2082, a file group 2083 that is various files for controlling the operation of the operation terminal 20, and the like in a non-volatile manner, and can use a hard disk drive (HDD), a solid state drive (SSD), or the like. The communication device 209 is a communication device for communicating with the air conditioner 10 and the server 30 that are external devices.

When the terminal control unit 25 of the operation terminal 20 is implemented by the hardware configuration illustrated in FIG. 17, the terminal control unit 25 is implemented by the CPU 201 executing the program of the program group 2082 stored in the built-in memory 208. Alternatively, a plurality of the CPUs 201 and a plurality of the built-in memories 208 may cooperatively implement the functions of the terminal control unit 25. Yet alternatively, some of the functions of the terminal control unit 25 may be implemented as an electronic circuit, and the other functions may be implemented by using the CPU 201 and the built-in memory 208.

The terminal input unit 21 and the terminal display unit 22 are implemented by the touch panel display 205. The terminal communication unit 23 is implemented by the communication device 209. The terminal storage unit 24 is implemented by the ROM 202 and the built-in memory 208.

As described above, in the operation terminal 20 of the air conditioning control system 1 according to the first embodiment, the operation icons corresponding to the functions of the air conditioner 10 among the functions that allow control of the control-target-appliance by the operation terminal 20 are arranged and displayed on the terminal display unit 22, so that a user can intuitively understand operations that can be performed on the air conditioner 10. As a result, the user can easily access the functions included in the air conditioner 10 by operating the operation icons arranged and displayed on the terminal display unit 22.

Moreover, in the operation terminal 20, when the screen update processing is performed, the display positions of the operation icons displayed in the icon display area 221 are the rearranged display positions for the operation icons that have been subjected to the operation of rearranging operation icon by a user. The operation icons not rearranged by the user are displayed at the display positions determined on the basis of the number of times of operation of each operation icon.

As a result, the plurality of operation icons displayed on the terminal display unit 22 of the operation terminal 20 is arranged at the display positions rearranged as intended by the user and the display positions rearranged in descending order of the number of times of operation, and thus arranged in the order convenient for the user. Therefore, on the operation terminal 20, a function useful for the user can be operated immediately. As a result, the user does not need to perform an operation such as switching the operation screen and exploring menu items in depth, and can easily operate the function useful for the user in a short time. Therefore, the operation terminal 20 enables easy access to each function of the air conditioner 10 with a high use frequency when the user performs setting of each function.

Moreover, in the operation terminal 20, the screen update processing causes each operation icon corresponding to the function of the air conditioner 10, among the functions that allow control of the control-target-appliance by the operation terminal 20, to be displayed in the icon color corresponding to the current state of each function and be accompanied by text information describing the content of the operation icon.

A user can thus visually easily and intuitively understand the latest function state of each function corresponding to the operation icon included in the air conditioner 10 by viewing the display in the icon display area 221 of the terminal display unit 22.

Therefore, the air conditioning control system 1 according to the first embodiment can obtain the operation terminal 20 in which the function of the air conditioner 10 that is useful for a user and controllable from the operation terminal 20 is easily visually recognized when the user views the terminal display unit 22 of the operation terminal 20.

The configuration illustrated in the above embodiment merely illustrates an example, and can thus be combined with another known technique or partially omitted and/or modified without departing from the scope of the present disclosure.

The invention claimed is:

1. An operation terminal that transmits control instruction information for controlling operation of a home appliance to the home appliance, the operation terminal comprising:
    a display to display, for a plurality of functions included in the home appliance, a plurality of operation icons individually corresponding to the functions in association with the control instruction information that instructs execution of the functions;
    a storage to store information on relationship of how large or small a selection count is, which is information on relationship of how large or small the number of selections of each of the plurality of operation icons is;
    a processor to execute a program; and
    a memory to store the program which, when executed by the processor, performs processes of:
    determining display positions of the plurality of the operation icons in the display unit on the basis of the information on relationship of how large or small the selection count is, and causing the display to display the plurality of the operation icons, wherein
    the storage stores a display-position-setting-value that is input from the outside of the operation terminal and indicates the display position of the operation icon, and
    when the storage stores both the information on relationship of how large or small the selection count is and the display-position-setting-value, the processor determines the display position of the operation icon for which the display-position-setting-value is stored in the storage on the basis of the display-position-setting-value, and then determines the display position of the operation icon for which the display-position-setting-value is not stored in the storage on the basis of the information on relationship of how large or small the selection count is.

2. The operation terminal according to claim 1, wherein the display includes a first display area in which a plurality of the operation icons is always displayed, and
    the processor causes the display to display a second display area obtained by expanding the first display area and controls to display, in the second display area, the operation icon that is not displayed in the first display area.

3. The operation terminal according to claim 1, wherein the storage stores, for each of the functions, function-state-information that is information on a current state of the function, and
    the processor controls to display a plurality of the operation icons colored on the display unit on the basis of the function-state-information.

4. The operation terminal according to claim 1, wherein the storage stores, for each of the functions, display-availability-information that is information on presence or absence of display of text information on the display, the text information being displayed on the display accompanying the operation icon and describing content of the operation icon, and
    the processor controls to display the text information on the display on the basis of the display-availability-information.

5. A home appliance control system comprising:
    the operation terminal according to claim 1; and
    a home appliance to be able to communicate with the operation terminal, receive control information transmitted from the operation terminal, and perform an operation based on the control information.

6. The home appliance control system according to claim 5, wherein
    the home appliance is an air conditioner.

* * * * *